(12) United States Patent
Oizumi et al.

(10) Patent No.: US 8,345,095 B2
(45) Date of Patent: Jan. 1, 2013

(54) BLIND SPOT IMAGE DISPLAY APPARATUS AND METHOD THEREOF FOR VEHICLE

(75) Inventors: Ken Oizumi, Tokyo (JP); Takeshi Akatsuka, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1550 days.

(21) Appl. No.: 11/542,193

(22) Filed: Oct. 4, 2006

(65) Prior Publication Data

US 2007/0081262 A1     Apr. 12, 2007

(30) Foreign Application Priority Data

Oct. 7, 2005  (JP) ................................. 2005-294636

(51) Int. Cl.
*H04N 5/232* (2006.01)
(52) U.S. Cl. ....................................................... 348/118
(58) Field of Classification Search .................... 348/118
See application file for complete search history.

(56) References Cited

U.S. PATENT DOCUMENTS

| | | | |
|---|---|---|---|
| 5,982,377 A * | 11/1999 | Yamashita et al. | 345/427 |
| 7,218,758 B2 * | 5/2007 | Ishii et al. | 382/104 |
| 7,307,655 B1 * | 12/2007 | Okamoto et al. | 348/222.1 |
| 2003/0108222 A1 * | 6/2003 | Sato et al. | 382/104 |
| 2003/0222983 A1 * | 12/2003 | Nobori et al. | 348/148 |
| 2004/0105579 A1 | 6/2004 | Ishii et al. | |
| 2006/0029255 A1 * | 2/2006 | Ozaki | 382/104 |

FOREIGN PATENT DOCUMENTS

| | | |
|---|---|---|
| JP | 2002-359838 A | 12/2002 |
| JP | 2004-34957 A | 2/2004 |
| JP | 2004-64131 A | 2/2004 |
| WO | WO 00/07373 A1 | 2/2000 |

* cited by examiner

*Primary Examiner* — Mehrdad Dastouri
*Assistant Examiner* — Mohammed Rahaman
(74) *Attorney, Agent, or Firm* — Foley & Lardner LLP

(57) ABSTRACT

An apparatus for displaying an image of a blind spot area to which driver's view is obstructed by a pillar, includes: an monitor on the pillar; a camera to take an image of a peripheral area including the blind spot area; and an image converting device to convert the camera image and create an output image to be displayed on the monitor. The image converting device sets in the peripheral area a reference surface defined as a surface of a sphere around a reference point at which the driver's eye point is assumed to exist; obtains positions of intersecting points at which half-lines extending from the reference point and passing through respective screen pixels of the monitor intersect with the reference surface; identifies pixels of the camera image corresponding to the respective intersecting points based on the camera's parameters; and creates the output image using data of the identified pixels.

5 Claims, 4 Drawing Sheets

BLIND SPOT IMAGE DISPLAY APPARATUS AND METHOD THEREOF FOR VEHICLE

BACKGROUND OF THE INVENTION

1. Field of the Invention

The present invention relates to a blind spot image display apparatus for a vehicle, which displays an image of a blind spot area to which a driver's view is obstructed by a structural component of the vehicle.

2. Description of the Related Art

Heretofore, a blind spot image display apparatus has been proposed, which assists a driver in his/her driving operations by taking, with a camera, an image of a blind spot area to which a driver's view is obstructed by a structural component of the vehicle, and by displaying the image of the blind spot area taken with the camera on a monitor such as a liquid crystal display provided in a vehicle compartment. Japanese Patent Application Laid-open Publication No. 2004-34957 discloses a blind spot image display apparatus which takes an image of a blind spot area with a camera disposed on the outside of a front pillar of a vehicle, and displays the image of the blind spot area taken with the camera on a monitor disposed on an interior part corresponding to the front pillar, in order to secure a driver's field of view corresponding to the blind spot area to which the driver's view is normally obstructed by the front pillar of the vehicle.

SUMMARY OF THE INVENTION

In a blind spot image display apparatus for a vehicle, in order to allow a driver to intuitively recognize the content of the image of the blind spot area, which is taken with the camera and being displayed on the monitor, it is necessary to display an image of the blind spot area as an image which is continuous to some extent with the actual view which the driver can see and not displayed on the monitor. However, in the case of conventional blind spot image display apparatuses as well as the above-described one, since the continuity of the image is not taken into consideration, there is a problem that drivers need to deal with complicated operations such as fine adjustment of physical positioning, setting and the like of a camera and a monitor depending on the drivers, in order to have a continuity between the image to be displayed on a monitor and the actual view.

The present invention has been made in the light of the above-described problem. An object of the present invention is to provide a blind spot image display apparatus for a vehicle, which is capable of displaying an image of a blind spot area as an image which is continuous to some extent with the actual view without requiring a driver to deal with complicated adjustment operations, and which thereby enables the driver to intuitively recognize the contents of the image.

An aspect of the present invention is a blind spot image display apparatus for a vehicle, which displays an image of a blind spot area to which a driver's view is obstructed by a structural component of the vehicle, the apparatus comprising: an image displaying device provided on the structural component of the vehicle; an imaging device configured to take an image of a peripheral area of the vehicle, the peripheral area including at least the blind spot area; and an image converting device configured to convert the image taken by the imaging device, and to create an output image to be displayed on the image displaying device, based on space coordinates of a reference point at which the driver's eye point is assumed to exist and space coordinates of each of pixels constituting a display screen of the image displaying device, wherein the image converting device sets a spherical reference surface defined as a surface of a sphere around the reference point, in a predetermined position in the peripheral area of the vehicle including the blind spot area, the image converting device obtains positions respectively of intersecting points at which half-lines extending from the reference point as a start point and passing respectively through the pixels constituting the display screen of the image displaying device, intersect with the spherical reference surface, the image converting device identifies pixels of the image taken by the imaging device corresponding to the respective intersecting points, based on parameters of the imaging device, and the image converting device creates the output image to be displayed on the image displaying device by using data of the respective identified pixels of the taken image.

BRIEF DESCRIPTION OF THE DRAWINGS

The invention will now be described with reference to the accompanying drawings wherein.

DETAILED DESCRIPTION OF THE PREFERRED EMBODIMENTS

Figure 1:
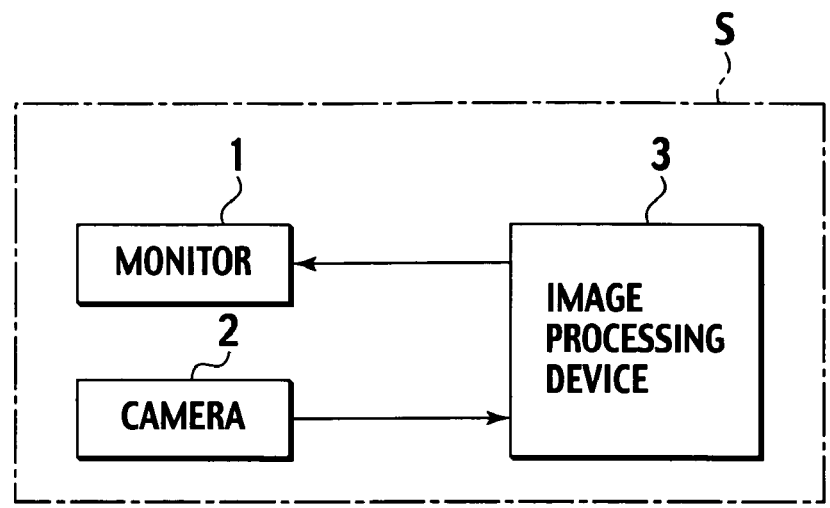
FIG. 1 is a block diagram showing a configuration of a blind spot image display apparatus for a vehicle to which the present invention is applied.

An embodiment of the present invention will be explained below with reference to the drawings, wherein like members are designated by like reference characters.

[Apparatus Configuration]

As shown in FIG. 1, a blind spot image display apparatus for a vehicle S of the present embodiment displays an image of a blind spot area BS to which the driver's view is obstructed by a front pillar of a vehicle, which is called pillar A. The blind spot image display apparatus for a vehicle includes a monitor (image displaying device/means) 1, a camera (imaging device/means) 2, and an image processing device (image converting device/means) 3.

Figure 2:
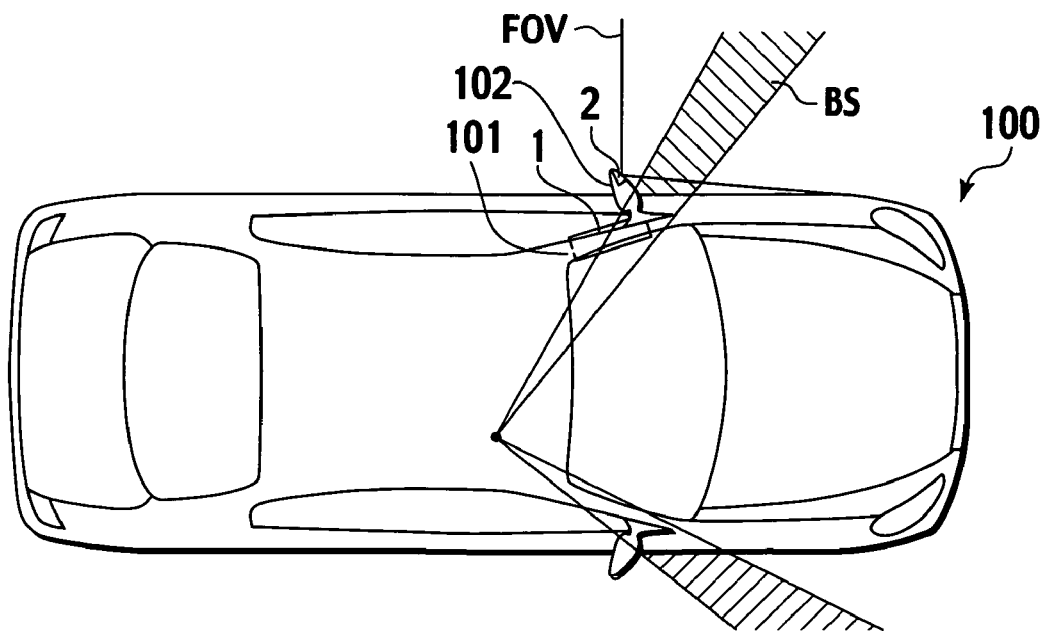
FIG. 2 explains specific positions of a monitor and a camera in the blind spot image display apparatus for a vehicle to which the present invention is applied.
Figure 3:
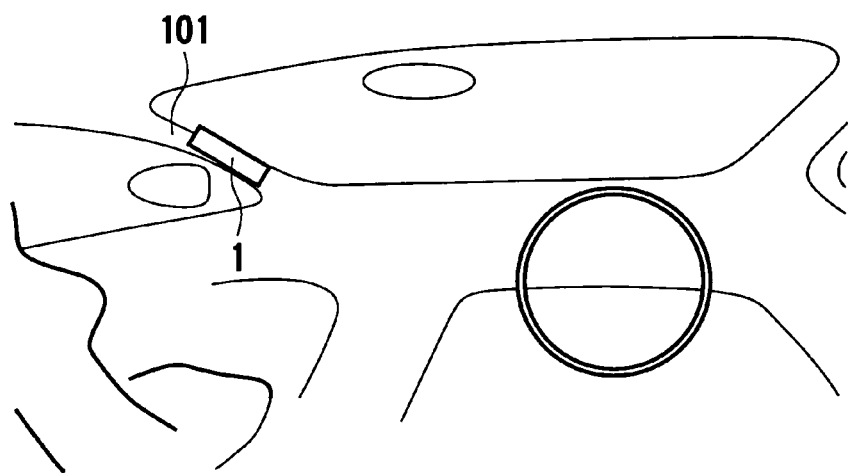
FIG. 3 shows attachment of a monitor to an interior part of a front pillar of a vehicle viewed from a driver's eye point.

The monitor 1, which displays an image of the blind spot area BS, is attached to an interior part of a front pillar 101 of a vehicle 100 as shown in FIGS. 2 and 3. Incidentally, in FIGS. 2 and 3, although the monitor 1 is attached to a front pillar 101 on the left side of the vehicle 100, the monitor 1 may be attached to a front pillar on the right side of the vehicle, or attached to front pillars on both of the right and left sides of the vehicle. While the front pillar 101 is in the driver's field of view, the driver's view is obstructed by this pillar 101, thus the blind spot area BS is generated. The monitor 1 displays an image of the blind spot area BS, whereby the driver of the vehicle 100 can recognize a situation in the blind spot area BS to which the driver's view is obstructed by the front pillar 101.

The camera 2 takes an image of a peripheral area of the vehicle, the peripheral area including at least the blind spot area BS. The camera 2 is attached to a vicinity of the front pillar 101 to which the monitor 1 is attached. Specifically, the camera 2 is attached to a door mirror 102 or the like of the vehicle 100. The camera 2 has an angle of view large enough to cover and make it possible to take an image of the blind spot area BS to which the driver's view is obstructed by the front pillar 101. In a case where a width of the monitor 1 is larger than a width of the front pillar 101, the camera 2 has an angle of view large enough to cover and make it possible to take an image of the blind spot area BS to which the driver's view is obstructed by the monitor 1. Incidentally, as long as the camera 2 can take an image of a necessary area, the camera 2 may be attached to any portion of the vehicle 100 such as a root portion of the front pillar 101, the roof or a vicinity of a windshield in an interior. Moreover, a plurality of cameras may be used to take images of necessary areas. An image taken with the camera 2 is sent to the image processing device 3, and a conversion process is performed on the image in the image processing device 3 to be thereafter displayed on the monitor 1.

The image processing device 3 converts an image of the blind spot area BS taken with the camera 2, creates an output image, and displays the output image (an image of the blind spot area BS after the conversion) on the monitor 1. For example, this process can be achieved by executing a predetermined program by using a computer. The blind spot image display apparatus for a vehicle S of the present embodiment has a great feature in particular with respect to the conversion process of an image by the image processing device 3. That is, in the case of the blind spot image display apparatus for a vehicle S of the present embodiment, in order to make an image of the blind spot area BS displayed on the monitor 1 to become an image which is continuous to some extent with a real image which is viewed from a driver's eye point, an image taken with the camera 2 is converted, based on space coordinates of a reference point at which the driver's eye point is presumed to exist, and on space coordinates of each of pixels constituting an image on the monitor 1. Accordingly, an output image to be displayed on the monitor 1 is created. The conversion process of an image by the image processing device 3 will be described later in detail.

[Operations]

In the case of the blind spot image display apparatus for a vehicle S of the present embodiment configured as above, first, the camera 2 takes an image of the peripheral area of the vehicle, the peripheral area including the blind spot area BS, and outputs the data of the taken image to the image processing device 3 by using NTSC or PAL video signal transmission line. Upon receiving the data of the taken image from the camera 2, the image processing device 3 divides the data into data for respective pixels, and stores the data thus divided in an internal input frame buffer.

Next, the image processing device 3 copies the pixel data in the input frame buffer to an output frame buffer, according to the contents of the conversion process. In the contents of the conversion process, addresses are described to indicate which part of the output frame buffer the data of the respective pixels in the input frame buffer should be copied to. That is, in the contents of the conversion process, a correspondence relation between respective pixels in the output frame buffer and respective pixels in the input frame buffer is described. The image processing device 3 copies the pixel data in the input frame buffer to the output frame buffer, thus completes an output image to be displayed on the monitor 1.

Next, the image processing device 3 outputs the contents on the output frame buffer, i.e., data of the output image, to the monitor 1 by using NTSC or PAL video signal transmission line. The monitor 1 performs a display process based on the data of an output image sent from the image processing device 3 so that an image of the blinded spot area BS to which the driver's view is obstructed by the front pillar is displayed on the monitor 1. In the case of the blind spot image display apparatus for a vehicle S of the present embodiment, repeatedly performing the series of the above-described processes for respective frames of images taken with the camera 2 makes it possible to display images of the blind spot area BS on the monitor 1 as a dynamic image. Incidentally, in the series of the above-described processes, all the technologies but the conversion process by the image processing device 3, which is a characteristic part of the blind spot image display apparatus for a vehicle S of the present embodiment, are publicly known in the field of image processing using computers.

[Content of Conversion Process]

Figure 4:
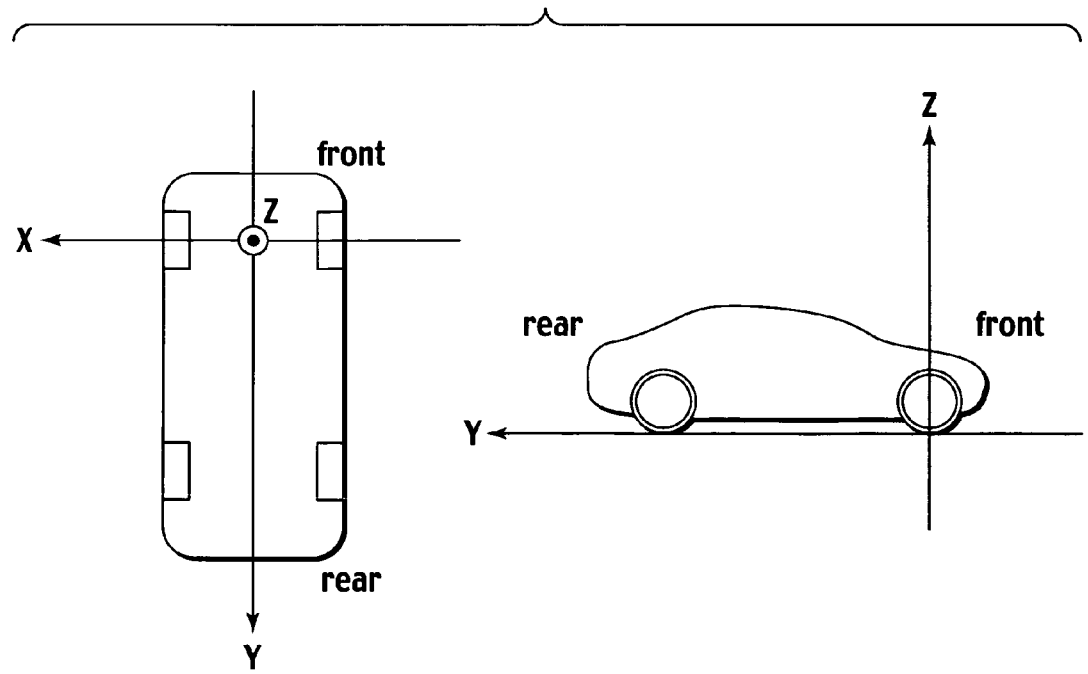
FIG. 4 explains a XYZ coordinate system which is used for a conversion process of an image processing device of the blind spot image display apparatus for vehicle to which the present invention is applied.

The content of the conversion process by the image processing device 3, which is a characteristic part of the blind spot image display apparatus for a vehicle S of the present embodiment, is specifically described below. Incidentally, in the following description, as shown in FIG. 4, a coordinate system is used with the x-axis taken in the left-right direction of the vehicle 100, the y-axis in the front-back direction thereof, and the z-axis in the height direction thereof. In this coordinate system, the x-y plane represents the ground surface.

Figure 5:
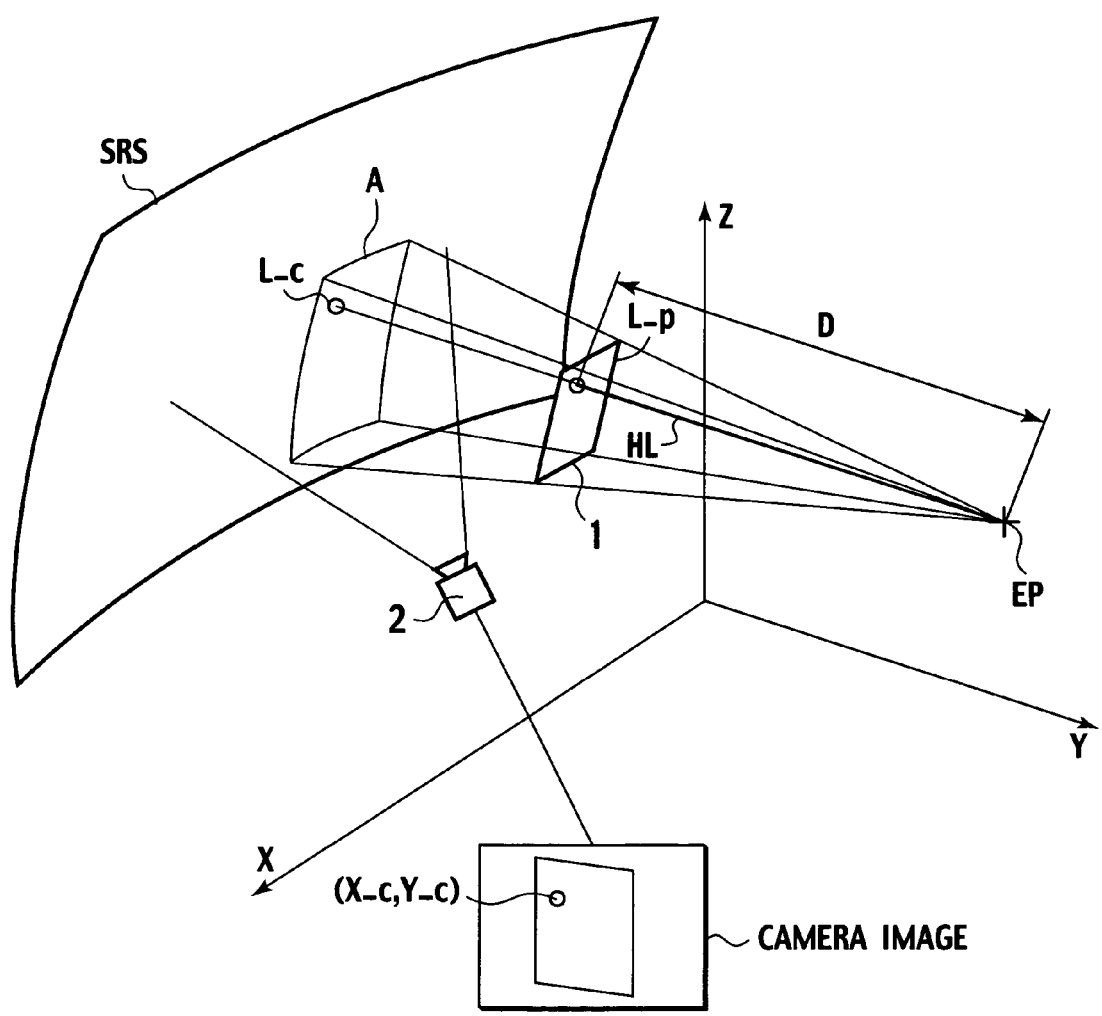
FIG. 5 is a diagram explaining contents of the conversion process of the image processing device.

In the blind spot image display apparatus for a vehicle S of the present embodiment, when performing a conversion process by the image processing device 3, first, space coordinates EP (x, y, z) of a driver's eye-point position EP which is a reference point are obtained as shown in FIG. 5. The driver's eye point position EP can be obtained by performing an actual measurement by using an existing eye-point position measuring device. As an eye-point position measuring device, for example, one may consider a device which takes the driver's face image by using a camera provided in a car and analyzes the face image to thereafter obtain the driver's eye-point position EP, or a device which obtains the driver's eye-point position by using angles of a room mirror or door mirrors. It also serves a purpose that a position of the driver's seat of the vehicle where the driver is seated is detected by using a seat position sensor, and that the driver's eye-point position EP is estimated based on the detected seat position. It also serves a purpose that the driver's physical information such as a height and a sitting height is obtained through inputting operations and the like by the driver, and that the driver's eye-point position EP is estimated based on the driver's physical information.

Next, the monitor 1 is assumed to be a collection of display pixels existing in a space, and space coordinates $L\_p(x, y, z)$ of each of pixels $L\_p$ constituting a display screen of the monitor 1 are obtained. By assuming the monitor 1 to be a collection of display pixels existing in a space, similar processes can be performed even in such cases as follows: a case of using a monitor whose display screen is flat such as a liquid crystal display; a case of using a monitor whose display screen is curved such as an old fashioned CRT; or a case of using a monitor whose display screen has a complicated curved shape such as an organic EL display. In a case of using a projector as the monitor 1, similar processes can be performed by using space coordinates of pixels on a plane of projection.

Furthermore, a reference surface SRS is set on a predetermined position in the peripheral area of the vehicle, the peripheral area including the blind spot area BS. Here, the reference surface SRS is a spherical surface defined as a surface of a sphere having its center on the driver's eye-point position EP which is the reference point, the sphere's radius being R. Incidentally, in FIG. 5, although a part of the spherical reference surface SRS is cut out and depicted for the sake of simplicity, in practice, the entire surface of a sphere around the driver's eye-point position EP is set, the radius of the sphere being R.

Furthermore, as shown in FIG. 5, intersecting points L_c are respectively obtained, at which the reference surface SRS intersects with half-lines HL which respectively extend from the driver's eye-point position EP being the reference point as a start point, and which respectively pass through display pixels L_p constituting a display screen of the monitor 1. Specifically, a distance D between the driver's eye-point position EP and the display pixels L_p is obtained from space coordinates EP (x, y, z) of the driver's eye-point position EP, and the space coordinates L_p(x, y, z) of each of pixels L_p constituting the display screen of the monitor 1. The reference surface SRS is defined as the surface of a sphere around the driver's eye-point position EP, which is the reference point, the radius of the sphere being R. Accordingly, a position of each of the intersecting points L_c at which the reference surface SRS intersects with the half-lines HL can be obtained by the following equation (1), the half-lines HL extending from the driver's eye-point position EP as a start point and passing respectively through pixels L_p of the monitor 1. The equation (1) always holds if R>D, irrespective of a positional relation between the driver's eye-point position EP and the display pixel L_p of the monitor 1. By using the equation (1), it is possible to obtain the space coordinates L_c(x, y, z) of all intersecting points L_c on the reference surface SRS, the intersecting points L_c respectively corresponding to pixels L_p constituting the display screen of the monitor 1.

$$L\_c = (L\_p - EP) \times (R/D) + EP \quad (1)$$

In the foregoing manner, obtained is the respective positions of the intersecting points L_c at which the reference surface SRS intersects with the half-lines HL which extend from the driver's eye-point position EP and which pass respectively through pixels L_p constituting the display screen of the monitor 1. Thereby a projection area A on the reference surface SRS is obtained. The projection area A is an area projected by the display screen of the monitor 1 as being viewed from the driver's eye point. The projection area A is an area obtained by specifying the blind spot area BS as an area on the spherical reference surface SRS, the area being projected with the driver's eye-point position EP as the reference point. The camera 2 is set to be able to take an image of this projection area A.

Next, by using various kinds of camera parameters such as a setting position, a direction and an aberration of lenses of the camera 2, pixels (X_c, Y_c) of a taken image of the camera 2 corresponding to the respective intersecting points L_c in the projection area A on the spherical reference surface SRS, are respectively specified. Thus, it is possible to obtain a correspondence relation between the respective pixels (X_c, Y_c) of the taken image of the camera 2 and the respective pixels L_p constituting the display screen of the monitor 1. In other words, it is possible to obtain information on which part of the output frame buffer the data of the respective pixels should be copied to, the pixels being of the taken image of the camera 2, and the data being stored in the input frame buffer. This correspondence relation becomes contents of the conversion process by the image processing device 3.

In the case of the blind spot image display apparatus for a vehicle S of the present embodiment, the image processing device 3 copies the data of respective pixels in the input frame buffer to the output frame buffer, according to the contents of the conversion process obtained in the foregoing manner, thus creates an output image. Then, this output image is displayed on the monitor 1. An image range of the output image displayed on the monitor 1 coincides with an image range which is obstructed by the monitor 1 when viewed from the driver's eye point. Accordingly, the output image displayed on the monitor 1 becomes an image which is continuous with the actual view which can be seen through a side window and the windshield of the vehicle, whereby the driver can intuitively recognize contents of the image. Incidentally, the monitor 1 is attached to the interior part corresponding to the front pillar of the vehicle. Accordingly, the driver can recognize a situation in the blind spot area BS to which the driver's view is obstructed by the front pillar, by viewing the output image displayed on the monitor 1.

Incidentally, the contents of the conversion process described above may be calculated for every time an output image is created. However, the contents of the conversion process remain unchanged unless a positional relation between the driver's eye-point position EP and the respective pixels L_p constituting the display screen of the monitor 1 change. Therefore, it also serves a purpose that a once calculated result is stored as a conversion table in a memory or the like of the image processing device 3, and that, in the following conversion processes, images taken with the camera 2 are be converted based on the conversion table to thereby create output images. Moreover, when a change of the driver's eye-point position EP is detected by the aforementioned eye-point position measuring device, it also serves a purpose that contents of the conversion process as described above are newly calculated, and that the conversion table is updated. In addition, it also serves a purpose that conversion tables corresponding to a plurality of eye-point positions EP are created in advance, and that any one of the conversion tables are selectively used depending on a result measured by the eye-point position measuring device.

Incidentally, in a case where the image processing device 3 performs a conversion process through a calculation by using the above-described spherical reference surface SRS, values of the Z-coordinate at intersecting points L_c on the spherical reference surface SRS may become negative in some cases depending on positional relations between the driver's eye-point position EP and the display pixels L_p of the monitor 1. However, in practice, the X-Y plane represents the ground surface, and therefore there are few cases where an object is on a position corresponding to a negative value of the Z-coordinate, i.e., a position lower than the ground surface level. In such a case, even if a process is performed while retaining the values of the Z-coordinate at the intersecting points L_c to be negative, some distortion occurs in the output image displayed on the monitor 1, which however rarely causes a practical problem. However, in a case where it is desirable that the distortion is suppressed to a minimum, a process of obtaining points L_c' on the ground surface (points at which the values of the Z-coordinate are "0") may be added, the points L_c' inevitably existing on the half-lines HL which extend from the driver's eye-point position EP toward the intersecting points L_c, at which the values of the Z-coordinate on the spherical reference surface SRS are negative.

Figure 6:
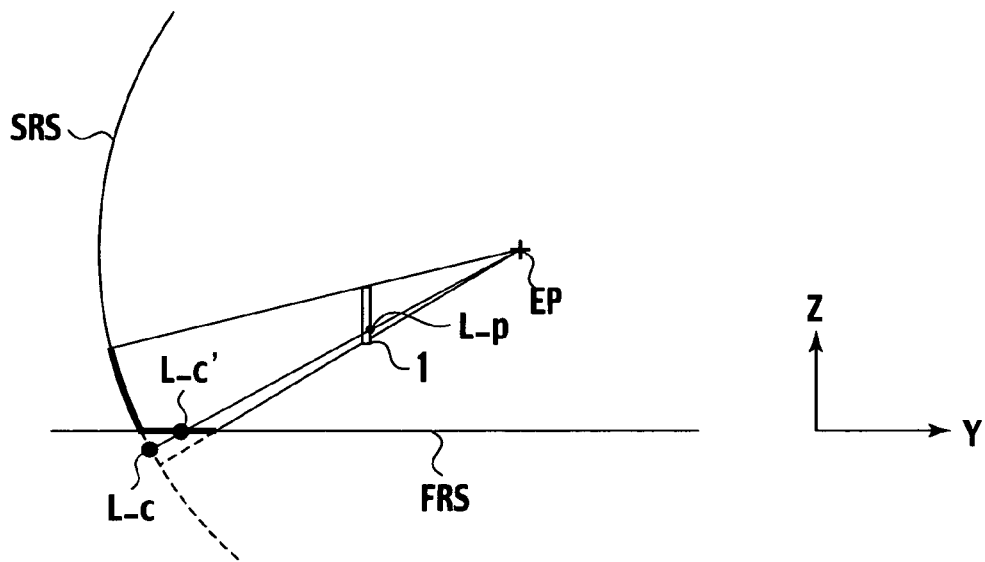
FIG. 6 is a diagram explaining contents of a conversion process in a case where a flat reference surface is set in addition to a spherical reference surface.

Specifically, as shown in FIG. 6, in addition to the above-described spherical reference surface SRS, the image processing device 3 sets a flat reference surface FRS, which is defined as a flat surface (a flat surface at which Z=0) substantially coinciding with the ground surface, and which is on a predetermined position in the peripheral area of a vehicle, the peripheral area including the blind spot area BS. Moreover, positions of the intersecting points L_c at which the spherical reference surface SRS and the half-lines HL intersect are obtained, the half-lines HL extending from the driver's eye-point position EP as a start point and passing respectively through the pixels L_p constituting the display screen of the monitor 1. In a case where the obtained values of the Z-coordinate of the intersecting points L_c are negative, positions of the intersecting points L_c' are obtained at which the half-lines HL and the flat reference surface FRS intersect. Then, the positions of the intersecting points L_c' are set as L_c. Incidentally, space coordinates of the intersecting points L_c' are represented by L_c' (x_c×(z_e/(z_e−z_c)), y_c×(z_e/(z_e−z_c)) 0), when respectively representing space coordinates of the intersecting points L_c by L_c(x_c, y_c, z_c), space coordinates of the driver's eye-point position EP by EP(x_e, y_e, z_e), and space coordinates of the display pixels LP of the monitor 1 by L_p(x_p, y_p, z_p). In addition, positions of intersecting points at which the half-lines HL intersect with the spherical reference surface SRS or with the flat reference surface FRS are respectively obtained, the half-lines HL extending from the driver's eye-point position EP as a start point and passing respectively through the pixels L_p constituting the display screen of the monitor. Thereafter, processes similar to the above-described ones are performed. This makes it possible to display an output image with little distortion on the monitor 1.

With respect to an output image created by using the above-described conversion process, an object near the reference surface is displayed with no distortion, however, any object on a place other than that is displayed with some distortion in some cases. In order to minimize an influence due to the above problem, it is a very effective measure that the flat reference surface FRS is set as a reference surface to be used for the calculation of the conversion process in addition to the spherical reference surface SRS.

Figure 7:
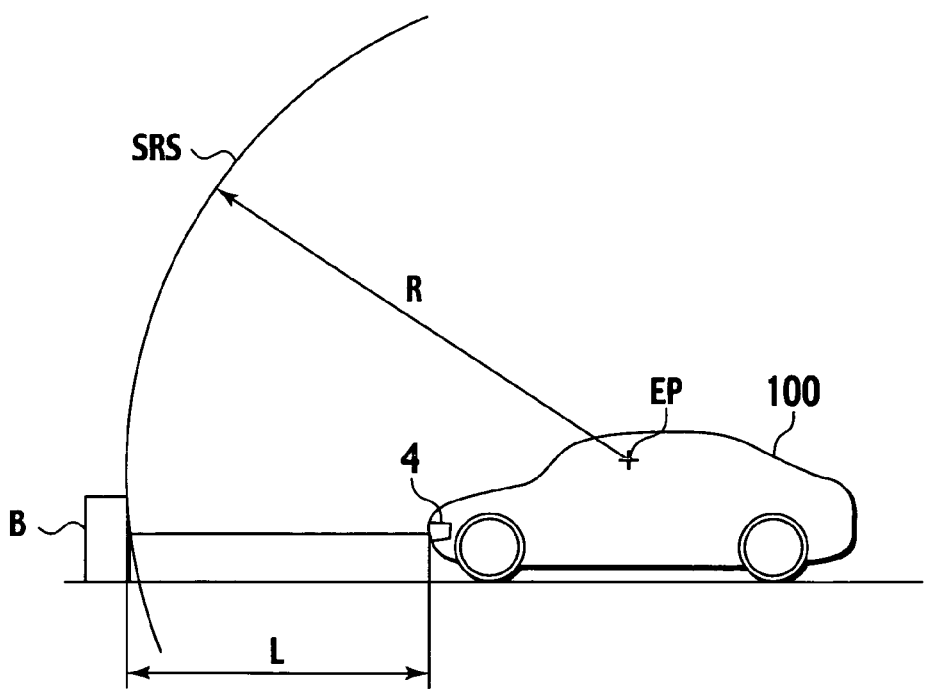
FIG. 7 explains an example of determining a distance from a driver's eye point position to the spherical reference surface, based on a distance from a vehicle to an obstacle.

Furthermore, among output images displayed on the monitor 1, an image of an obstacle existing in the blind spot area BS is critical for the driver. Moreover, in order to display the image of the obstacle existing in the blind spot area BS with little distortion, it is also very effective to set the reference surface near the obstacle. From the above point of view, in the blind spot image display apparatus for a vehicle S of the present embodiment, for example, as shown in FIG. 7, it also serves a purpose that, by using an obstacle detecting device (obstacle detecting device/means) 4 which detects an obstacle existing in the peripheral area of the vehicle and which measures a distance from the vehicle 100 to the obstacle, a distance L from the vehicle 100 to an obstacle B measured by the obstacle detecting device 4 is set as a reference, and that a distance from the driver's eye-point position EP to the spherical reference surface SRS, i.e., the radius R of a sphere for defining the spherical reference surface SRS, is determined.

That is, since it is supposed that the driver's eye-point position EP to the vehicle 100 is substantially constant, once the distance L from the vehicle 100 to the obstacle B is figured out, a distance from the driver's eye-point position EP to the obstacle B will be obtained. In addition, the distance from the driver's eye-point position EP to the obstacle B is set as the distance from the driver's eye-point position EP to the spherical reference surface SRS, i.e., the radius R of a sphere for defining the spherical reference surface SRS. This makes it possible to set the spherical reference surface SRS near the obstacle B. Performing the above conversion process by using the spherical reference surface SRS thus set makes it possible to display the obstacle B in the blind spot area BS on the monitor 1 as an image with little distortion. Incidentally, as the obstacle detecting device 4 for measuring the distance from the vehicle 100 to the obstacle B, any one of publicly known devices such as a millimeter wave radar or a laser radar can be used as an obstacle detecting device 4 for a vehicle.

[Effects of the Embodiment]

As described above in detail by referring to the specific examples, the blind spot image display apparatus for a vehicle S of the present embodiment achieves the following. The image processing device 3 converts an image of the blind spot area BS taken with the camera 2 and creates an output image to be displayed on the monitor 1, based on the space coordinates of the reference point at which the driver's eye-point is assumed to exist, and on the space coordinates of each of the pixels constituting the display screen of the monitor 1 disposed on the front pillar of the vehicle 100. This makes it possible to display, on the monitor 1, an image of the blind spot area BS to which the driver's view is obstructed by the front pillar of the vehicle 100, the image of the blind spot area BS being continuous to some extent with an actual view seen through the windshield and the side window from the driver's eye-point, without performing cumbersome adjusting operations on the camera 2 and monitor 1. This also enables the driver to intuitively recognize contents of an image of the blind spot area BS.

Furthermore, in the case of the blind spot image display apparatus for a vehicle S of the present embodiment, the image processing device 3 sets the spherical reference surface SRS on a predetermined position in the peripheral area of a vehicle, and creates an output image to be displayed on the monitor 1 by a calculation using the spherical reference surface SRS. This makes it possible to appropriately display an image of the blind spot area BS, which is continuous to some extent with a real view, on the monitor 1, without making calculation load excessively large. That is, as a technique for the conversion process of the image processing device 3, it is considered that a plurality of flat reference surfaces FRS are set in the peripheral area of the vehicle, and that the same processes as above are performed using the plurality of flat reference surfaces FRS. However, in a case of performing the conversion processes by using the plurality of flat reference surfaces FRS, comparison calculation is necessary after obtaining positions of intersecting points where the half-lines intersect with respective flat reference surfaces FRS, the half-lines extending from the reference point as a start point at which the driver's eye point is assumed to exist, and passing respectively through the pixels of the monitor 1. Therefore, it is concerned that this results in a huge amount of calculation. On the other hand, in the case of the blind spot image display apparatus for a vehicle S of the present embodiment, the spherical reference surface SRS is defined as a surface of a sphere around the reference point at which the driver' eye point is expected to exist, and the conversion process is performed by using this spherical reference surface SRS. This simplifies the calculation of obtaining the intersecting points, and makes the comparison calculation unnecessary. Accordingly, this makes it possible to appropriately display an image of the blind spot area BS, which is continuous to some extent with a real view, without making calculation load in the image processing device 3 excessively large. This also makes it possible to achieve the image processing device 3 with more simplified hardware.

Incidentally, the blind spot image display apparatus for a vehicle S described above is an example of the present invention. It is a matter of course that the present invention is not limited to the above-described example, and that various changes can be made to detail parts and the like of the specific device configurations and the conversion process, without departing from the technical spirit of the present invention. For example, in the case of the blind spot image display apparatus for a vehicle S described above, the monitor 1 is disposed on the interior part corresponding to the pillar of the vehicle 100, and thereby an image of the blind spot area BS to which the driver's view is obstructed by the front pillar of the vehicle 100 is displayed on the monitor 1. However, it also serves a purpose that the monitor 1 is disposed on a center pillar, a rear pillar or the like of a vehicle, and that an image of a blind spot area to which the driver's view is obstructed by any of the structural components of the vehicle is displayed on the monitor 1.

Moreover, in the case of the blind spot image display apparatus for a vehicle S described above, although it is assumed that an image of the blind spot area BS is constantly displayed, it also serves a purpose that switching between the displaying and the non-displaying of an image of the blind spot area BS can be performed depending on the situation of the periphery of the vehicle. That is, a case where the displaying of an image of the blind spot area BS is particularly required is a case there is a human being, another vehicle or the like in the blind spot area BS. For example, it also serves a purpose that the situation of the periphery of the vehicle is detected by using a proximity sensor, or information indicating the situation of the periphery of the vehicle is obtained through communications with a peripheral infrastructure, and that, depending on the obtained result, switching is performed between the displaying and the non-displaying of an image of the blind spot area BS on the monitor 1. It is a matter of course that switching between the displaying and the non-displaying of an image of the blind spot area BS on the monitor 1 may be performed by the driver's switching operations or the like. As described above, by performing switching between the displaying and the non-displaying of an image of the blind spot area BS depending on the situation of the periphery of the vehicle, an effect such as reduction in power consumption can be expected.

Furthermore, in the case of the blind spot image display apparatus for a vehicle S described above, by assuming that the reference point, which is used for the conversion process of the image processing device 3, is a single point (the driver's eye-point position EP), the image processing device 3 converts an image taken with the camera 2, and creates an output image to be displayed on the monitor 1, based on the space coordinates of the driver's eye-point position and on the space coordinates of the each of pixels constituting the display screen of the monitor 1. However, it also serves a purpose that, by assuming that a space area including the positions of the driver's right and left eyes is the reference point, the image processing device 3 converts an image taken with the camera 2, and creates an output image to be displayed on the monitor 1, based on the space coordinates of the positions of the driver's right and left eyes existing in this space area, and on the space coordinates of each of the pixels constituting the display screen of the monitor 1. In this case, irrespective of which one of the driver's left and right eyes is dominant in sight, it is possible to display an image of the blind spot area BS on the monitor 1 in a way that the image is continuous to some extent with an actual view seen through the windshield and the side window from the driver's eye point.

Furthermore, it also serves a purpose that a space area presumed to be a range in which the driver's eye point moves depending on a move of the driver's head during the driving, is assumed to be the reference point, and that the image processing device 3 converts an image taken with the camera 2, and creates an output image to be displayed on the monitor 1, based on space coordinates of a plurality of spatial points existing in the above space area, and on the space coordinates of each of the pixels constituting the display screen of the monitor 1. In this case, even when the driver's eye point position is shifted due to the move of the driver's head, it is possible to display an image of the blind spot area BS on the monitor 1 in a way that the image is continuous to some extent with an actual view seen through the windshield and the side window from the driver's eye point.

The present disclosure relates to subject matters contained in Japanese Patent Application No. 2005-294636, filed on Oct. 7, 2005, the disclosures of which is expressly incorporated herein by reference in its entirety.

What is claimed is:

1. A blind spot image display apparatus for a vehicle, which displays an image of a blind spot area to which a driver's view is obstructed by a structural component of the vehicle, the apparatus comprising:

an image displaying device having a display screen which is disposed on a part of the structural component of the vehicle and creates a blind spot area together with the part of the structural component, the display screen being constituted by screen pixels arranged thereon;

an imaging device configured to take an image of a peripheral area of the vehicle, the imaging device having a field of view such that the peripheral area includes at least the blind spot area which is created by the part of the structural component and the display screen; and an image converting device configured to convert the image taken by the imaging device, and to create an output image to be displayed on the image displaying device, based on first space coordinates of a reference point at which the driver's eye point is assumed to exist and second space coordinates of each of the screen pixels, the first and second space coordinates being given in a coordinate system fixed to the vehicle, wherein:

the image converting device sets a spherical reference surface defined as a surface of a sphere around the reference point, in a predetermined position in the peripheral area, the image converting device obtains positions respectively of intersecting points at which half-lines extending from the reference point as a start point and passing respectively through the screen pixels, intersect with the spherical reference surface, the image converting device identifies pixels of the image taken by the imaging device corresponding to the respective intersecting points, based on parameters of the imaging device, and the image converting device creates the output image by using data of the respective identified pixels of the taken image.

2. The blind spot image display apparatus for a vehicle as recited in claim 1, wherein:

the image converting device sets a flat reference surface defined as a flat surface which substantially coincides with a ground surface, in the predetermined position in the peripheral area of the vehicle including the blind spot area, in addition to the spherical reference surface, the image converting device obtains positions respectively of intersecting points at which the respective half-lines extending from the reference point as the start point and passing respectively through the screen pixels, intersect with any one of the spherical reference surface and the flat reference surface, the image converting device identifies pixels of an image taken by the imaging device corresponding to the respective intersecting points, based on parameters of the imaging device, and the image converting device creates an output image to be displayed on the image displaying device by using data of the respective identified pixels of the taken image.

3. The blind spot image display apparatus for a vehicle as recited in claim 1, the apparatus further comprising:

an obstacle detecting device configured to detect an obstacle existing around the vehicle, and to measure a distance from the vehicle to the obstacle, wherein the image converting device determines a radius of the sphere around the reference point, by using the distance from the vehicle to the obstacle measured by the obstacle detecting device as a reference.

4. A method of displaying an image of a blind spot for a vehicle, the blind spot area being an area to which a driver's view is obstructed by a structural component of the vehicle, the method comprising the steps of:

providing an image displaying device having a display screen which is disposed on a part of the structural component of the vehicle and creates a blind spot area together with the part of the structural component, the display screen being constituted by screen pixels arranged thereon;

providing an imaging device configured to take an image of a peripheral area of the vehicle, the imaging device having a field of view such that the peripheral area includes at least the blind spot area which is created by the part of the structural component and the display screen; and converting the image taken by the imaging device to create an output image to be displayed on the image displaying device, based on first space coordinates of a reference point at which the driver's eye point is assumed to exist and second space coordinates of each of the screen pixels, the first and second space coordinates being given in a coordinate system fixed to the vehicle, wherein, in the step of converting the image:

a spherical reference surface defined as a surface of a sphere around the reference point is set in a predetermined position in the peripheral area, positions respectively of intersecting points at which half-lines extending from the reference point as a start point and passing respectively through the screen pixels, intersect with the spherical reference surface are obtained, pixels of the image taken by the imaging device corresponding to the respective intersecting points, are identified based on parameters of the imaging device, and the output image is created by using data of the respective identified pixels of the taken image.

5. A blind spot image display apparatus for a vehicle, which displays an image of a blind spot area to which a driver's view is obstructed by a structural component of the vehicle, the apparatus comprising:

image displaying means for displaying an image, wherein the image displaying means comprises a display screen which is disposed on apart of the structural component of the vehicle and creates a blind spot area together with the part of the structural component, the display screen being constituted by screen pixels arranged thereon;

imaging means for taking an image of a peripheral area of the vehicle, the imaging means having a field of view such that the peripheral area includes at least the blind spot area which is created by the part of the structural component and the display screen; and image converting means for converting the image taken by the imaging means, and to create an output image to be displayed on the image displaying means, based on first space coordinates of a reference point at which the driver's eye point is assumed to exist and second space coordinates of each of the screen pixels, the first and second space coordinates being given in a coordinate system fixed to the vehicle, wherein:

the image converting means sets a spherical reference surface defined as a surface of a sphere around the reference point, in a predetermined position in the peripheral area, the image converting means obtains positions respectively of intersecting points at which half-lines extending from the reference point as a start point and passing respectively through the screen pixels, intersect with the spherical reference surface, the image converting means identifies pixels of the image taken by the imaging means corresponding to the respective intersecting points, based on parameters of the imaging means, and the image converting means creates the output image by using data of the respective identified pixels of the taken image.

* * * * *